| United States Patent [19] | [11] Patent Number: 4,948,616 |
| Iijima et al. | [45] Date of Patent: Aug. 14, 1990 |

[54] SWEETENED CONDENSED MILK LIKE COMPOSITION AND A METHOD FOR PRODUCING IT

[75] Inventors: Yoshio Iijima, Yokohama; Ryohei Yamabe, Tokorozawa; Masahiro Nakatsukasa, Urawa; Hiroko Ogiwara, Gyoda, all of Japan

[73] Assignee: Lotte Company Limited, Tokyo, Japan

[21] Appl. No.: 347,385

[22] Filed: May 2, 1989

[51] Int. Cl.$^5$ ............................................. A23C 9/00
[52] U.S. Cl. ..................................... 426/587; 426/658
[58] Field of Search ............................... 426/587, 658

[56] References Cited

U.S. PATENT DOCUMENTS 3,691,013  9/1972  Sakai et al. ........................ 426/587
4,587,119  5/1986  Bucke et al. .......................... 426/3

*Primary Examiner*—Donald E. Czaja
*Assistant Examiner*—Helen Pratt
*Attorney, Agent, or Firm*—Young & Thompson

[57] ABSTRACT

There is disclosed a sweetened condensed milk composition comprising palatinose and palatinose syrup. The final solid weight ratio of palatinose to palatinose syrup is less than 2:1 and preferably not more than 1:1. The sugar composition of a constituent sugar solution preferably includes not more than 70% of palatinose and not less than 20% trehalulose. Preferably, milk solid is not less than 25% and water is not more than 30% of the composition. Suitable milks may be selected from the group consisting of raw milk, partially fat-removed milk, nonfat milk and processed milk. Other suitable milk products may be selected from the group consisting of evaporated milk and evaporated nonfat milk. There is also disclosed a method for producing a sweetened condensed milk composition.

7 Claims, No Drawings

SWEETENED CONDENSED MILK LIKE COMPOSITION AND A METHOD FOR PRODUCING IT

FIELD OF THE INVENTION

The present invention relates to a sweetened condensed milk composition, the sugar components of which comprise palatinose and palatinose syrup. More specifically, the invention relates to a sweetened condensed milk composition which has a reduced tooth decaying property and a good flavor, having equivalent physical properties and storage properties as a sweetened condensed milk containing sucrose.

BACKGROUND OF THE INVENTION

A sweetened condensed milk which is produced by adding sucrose to a starting milk material such as raw milk, followed by concentrating and sterilizing, retains a distinct flavor of cow's milk. The condensed product is easily used, and is convenient for transport and storage, so that it is widely used in confections such as candies and ice creams. However, recently, the properties which are required for foods have gradually changed, so that more healthy foods are required having equal mouth-feel and flavor, but those tendency to induce tooth decay is prevented. Reflecting such requirements, a boom for so-called healthy confections has also occurred in the confection producing field to commercialize, for example, a candy having reduced tooth decaying property and further to improve such candy.

Usually, a milk material which is used to produce confections such as candy is a sweetened condensed milk or nonfat sweetened condensed milk which is produced by adding tooth-decaying sucrose. When a confection which does not contain the tooth-decaying sucrose is desired to be produced, conventionally, an evaporated milk or a powdered milk which are milk materials not containing sucrose was used. However, when such conventional milk materials are used for production of confections, complication of the production process or loss of quality of products is apt to take place. For example, when non-sugar condensed milk is used for production of candy, i takes a long time to concentrate the candy material solution because of high water content (72.5%), so that problems take place in which the color of the dough after completion becomes excessive and a denaturation of tissue occurs. Moreover, for example, when the powdered milk is used for production of candy, a step for first dissolving the powdered milk in water before preparation is required, so that the resulting products are apt to have surface roughness with passage of time, which may give a problem.

It is explained that the reason why sucrose has tooth decaying property is that sucrose becomes a nutrient for specific bacteria inhabiting the mouth and that the insoluble glucan which is produced by the bacteria facilitates the formation of sordes on teeth. Therefore, if a sugar which does not cause the formation of insoluble glucan is used, a food which has such a property that tooth decay does not readily occur may be provided.

Palatinose is known as one of such a sugar that has reduced tooth decaying property. Palatinose is a disaccharide comprising glucose and fructose bonding by α-1,6 bond, and has a good sweet taste. Palatinose is produced from sucrose by action of a transferase contained in certain microorganisms by carrying out a cleavage and rebonding reaction of α-1,6 bond of glucose and fructose in sucrose. Because a reaction mixture after transferase reaction contains various by-products other than palatinose, pure palatinose is produced by microcrystallization after steps of removing salts and concentration or the like. The remaining solution after crystallization is called palatinose syrup, which is a by-product of palatinose production. A typical palatinose syrup has the following composition (Table 1):

TABLE 1

| Composition of palatinose syrup (weight %) | |
| --- | --- |
| Fructose | 16% |
| Glucose | 15% |
| Sucrose | 4% |
| Palatinose | 20% |
| Trehalulose | 40% |
| Isomaltose | 4% |
| Other sugars | 1% |
| Total | 100% |

This palatinose syrup has a good sweet taste, doesn't have a differing taste, has little color and is considered to have a reduced tooth decaying property. Even if production of a food product is carried out by simply replacing sucrose which is the conventional material for sugar addition by pure palatinose which has a reduced tooth decaying property and a good sweet taste in order to produce a sweetened condensed milk like composition, crystallization of palatinose takes place during production process or storage and it is thus not possible to obtain a sweetened condensed milk composition with a stable quality.

SUMMARY OF THE INVENTION

The object of the present invention is to provide a sweetened condensed milk composition which has a reduced tooth decaying property and a good sweet taste as well as physical properties and storage properties equivalent to those of a sweetened condensed milk containing sucrose, by providing a sweetened condensed milk composition containing palatinose which has a reduced tooth decaying property and has a good sweet taste present in a form having stable properties such that no crystallization of palatinose occurs during production or storage of the product.

According to the present invention, there is provided a sweetened condensed milk composition comprising palatinose and palatinose syrup characterized in that a final solid weight ratio of palatinose to palatinose syrup is smaller than 2:1.

According to the present invention, there is further provided a method for producing a sweetened condensed milk like composition comprising filtering a raw milk or milk product, clarifying, standardizing the composition, adding sweetening materials, sterilizing, concentrating, cooling, seeding lactose, cooling and charging characterized in that the sweetening materials are formulated in such a way that the final solid weight ratio of palatinose to palatinose syrup is smaller than 2:1 to prepare a sugar solution to be added.

PREFERRED EMBODIMENTS OF THE INVENTION

It is preferable to make the final solid weight ratio of palatinose to palatinose syrup not more than 1:1.

By using a sugar composition of a sugar solution including not more than 70% of palatinose and not less than 20% trehalulose, it is possible to prevent crystallization of palatinose during production or storage of product to provide a good sweetened condensed milk composition with a stable quality.

It is preferable to set the milk solids content at not less than 25% of the composition to prevent loss of distinct milk flavor and taste. Moreover, it is preferable to set the water content at not more than 30% for convenient usage without taking a long time for concentration of a preparation for use as a confection ingredient.

The sweetened composition of the present invention may be produced either by using materials selected from the group consisting of raw milk, low-fat milk, nonfat milk and processed milk, or by using materials selected from the group consisting of condensed milk, evaporated milk and evaporated nonfat milk.

The sweetened condensed milk composition of the present invention contains sweetening materials comprising palatinose and palatinose syrup with a reduced tooth decaying property, so that the composition has a reduced tooth decaying property. When only palatinose is used for the sweetening material, crystallization of palatinose takes place during production or storage of the product. On the other hand, in the sweetened condensed milk composition of the present invention, a sweetening material comprising palatinose and palatinose syrup is used, so that no crystallization occurs. This is due to various sugar components contained in palatinose syrup (mainly trehalulose) which interact in the composition solution so that the dissolved state of palatinose is stabilized. After repeated experiments, it is revealed that the sweetening material comprising palatinose and palatinose syrup has such function.

According to the present invention, a sweetened condensed milk composition may be obtained which has a low sweet taste, excellent flavor and a reduced tooth decaying property compared with the conventional condensed milk or evaporated milk with sucrose. Moreover, the sweetened condensed milk composition of the present invention shows equivalent physical properties and storage properties compared to the conventional condensed milk with sucrose, so that when palatinose is applied to the conventional foods using otherwise conventional condensed milk, without additional conditions, it may be used exactly and easily as a substitute milk ingredient.

EXAMPLES 1-3 AND COMPARATIVE TESTS

The present invention will be explained in detail with reference to the following examples, to which the invention is not to be construed as limited.

The various ingredients were measured such that final concentrations (final solid concentrations) of milk ingredients and sweetening materials in a product of sweetened condensed milk composition are as shown in Table 2. A sweetened condensed milk composition was produced according to the following production steps and conditions. Namely, a sweetened condensed milk composition was produced by filtering a raw milk after inspection, clarifying, carrying out composition standardization, adding sweetening materials, sterilizing (75° C., 10 mins.), concentrating (with a batch-type vacuum concentrator at 48° C. at a pressure of not less than 600 mmHg), cooling (28° C.), seeding lactose, cooling (25° C.) and charging.

The composition of each component of the resulting sweetened condensed milk composition is shown in Table 3. As the composition of palatinose syrup was shown in said Table 1, the sugar composition shown in Table 3 may be calculated from Table 2.

Results of examination for qualities of the obtained sweetened condensed milk composition are shown in Table 4. In the examinations for viscosity, lactose crystal size and bacteria number, Examples 1-3 and comparative tests 1-2 all show substantially the same properties as the conventional sweetened condensed milk with sucrose (control). In the recrystallization tests, recrystallization was not detected until 90 days after beginning of the examination in the Example 1 (final solid weight ratio of palatinose to palatinose honey is 0), Example 2 (the above final solid weight ratio is 0.5:1) and Example 3 (the above final solid weight ratio is 1:1). On the other hand, recrystallization occurred 7 days after beginning of the examination in the comparative test 1 (the above final solid weight ratio is 2:1), and 1 day after beginning of the examination in the comparative test 2 (the above final solid weight ratio is ∞).

In addition, for the Example 2 and the control, when a sensory evaluation test was carried out with 10 special panelists, the agreed result was that the Example 2 has a less sweet taste with a refreshed feel and a better flavor of milk than the control.

TABLE 2

| | Example 1 | Example 2 | Example 3 | Comparative Test 1 | Comparative Test 2 | Control |
|---|---|---|---|---|---|---|
| Final concentrations of materials in a sweetened condensed milk like composition | | | | | | |
| Milk solid of raw milk* | 29.5 | 29.5 | 29.5 | 29.5 | 29.5 | 29.5 |
| Solid of material sugar | | | | | | |
| Palatinose | | 15.0 | 22.5 | 30.0 | 45.0 | |
| Palatinose syrup | 45.0 | 30.0 | 22.5 | 15.0 | | |
| Sucrose | | | | | | 45.0 |

*Contents of milk solid of raw milk: milk fat 8.3, milk protein 7.8, lactose 11.6, ash 1.8 (total 29.5)

TABLE 3

| | Example 1 | Example 2 | Example 3 | Comparative Test 1 | Comparative Test 2 | Control |
|---|---|---|---|---|---|---|
| Composition of each components in a sweetened condensed milk like composition | | | | | | |
| Sugar composition % | | | | | | |
| Palatinose | 9.0 (20.0) | 21.0 (46.7) | 27.0 (60.0) | 33.0 (73.3) | 45.0 (100.0) | |
| Trehalulose | 18.0 (40.0) | 12.0 (26.7) | 9.0 (20.0) | 6.0 (13.3) | | |
| Sucrose | 1.8 (4.0) | 1.2 (2.7) | 0.9 (2.0) | 0.6 (1.3) | | 45.0 (100.0) |
| Other sugars | 16.2 (36.0) | 10.8 (24.0) | 8.1 (18.0) | 5.4 (12.0) | | |
| Total | 45.0 (100.0) | 45.0 (100.0) | 45.0 (100.0) | 45.0 (99.9) | 45.0 (100.0) | 45.0 (100.0) |
| Milk solid % | 29.5 | 29.5 | 29.5 | 29.5 | 29.5 | 29.5 |

TABLE 3-continued

Composition of each components in a sweetened condensed milk like composition

|   | Example 1 | Example 2 | Example 3 | Comparative Test 1 | Comparative Test 2 | Control |
|---|---|---|---|---|---|---|
| Water % | 25.5 | 25.5 | 25.5 | 25.5 | 25.5 | 25.5 |
| Total % | 100.0 | 100.0 | 100.0 | 100.0 | 100.0 | 100.0 |

Figures in ( ) represent concentrations of materials for sugar addition in a material sugar solution after formulation and preparation of materials for sugar addition.

TABLE 4

Results of tests for properties of sweetened condensed milk like composition

|   | Example 1 | Example 2 | Example 3 | Comparative Test 1 | Comparative Test 2 | Control |
|---|---|---|---|---|---|---|
| Viscosity* | | | | | | |
| Immediately after production | 95 | 100 | 90 | 89 | 92 | 70 |
| After 30 days of storage at 20° C. |  | 105 |  |  |  |  |
| After 30 days of storage at 5° C. |  | 100 |  |  |  |  |
| After 7 days of storage at 40° C. |  | 120 |  |  |  | 200 |
| After 21 days of storage of 40° C. |  | 150 |  |  |  | ∞ |
| Lactose crystal size (μ) | | | | | | |
| Mean |  | 3 |  |  |  | 3 |
| Largest |  | 10 |  |  |  | 10 |
| Bacteria number (No./g) | | | | | | |
| Immediately after production |  | 70 |  |  |  | 70 |
| After 30 days of storage at 20° C. |  | 70 |  |  |  | 70 |
| After 7 days of storage at 35° C. |  | 80 |  |  |  | 80 |
| Recrystallization | | | | | | |
| Immediately after production | — | — | — | — | — | — |
| After 1 day of storage at 20° C. | — | — | — | — | + | — |
| After 7 days of storage at 20° C. | — | — | — | + |  | — |
| After 30 days of storage at 20° C. | — | — | — |  |  | — |
| After 60 days of storage at 20° C. | — | — | — |  |  | — |
| After 90 days of storage at 20° C. | — | — | — |  |  | — |

*Viscosity: Mojonnier small ball measured value

What is claimed is:

1. A sweetened condensed milk composition comprising milk of reduced water content in solution with palatinose and palatinose syrup wherein said palatinose and palatinose syrup are present in a final solid weight ratio less than about 2:1.

2. The sweetened condensed milk composition according to claim 1, wherein the final solid weight ratio of palatinose to palatinose syrup is less than about 1:1.

3. The sweetened condensed milk composition according to claim 1, formed by adding to said milk a sugar solution containing not more than about 70% palatinose and not less than about 20% trehalulose.

4. The sweetened condensed milk composition according to claim 1, comprising not less than about 25% milk solids and not more than about 30% water.

5. The sweetened condensed milk composition according to claim 1, formed from a milk selected from the group consisting of raw milk, low-fat milk, nonfat milk and processed milk.

6. The sweetened condensed milk composition according to claim 1, wherein said milk is selected from the group consisting of evaporated milk and evaporated nonfat milk.

7. A method for producing a sweetened condensed milk composition comprising filtering a starting milk or milk product, then clarifying said milk, then carrying out composition standardization, then adding sweetening materials, next sterilizing, concentrating and cooling said milk followed by seeding lactose, cooling and charging wherein the sweetening materials comprise palatinose and palatinose syrup in a final solid weight ratio of less than about 2:1.

* * * * *